(12) United States Patent
Tyler et al.

(10) Patent No.: US 10,543,640 B2
(45) Date of Patent: Jan. 28, 2020

(54) ADDITIVE MANUFACTURING SYSTEM HAVING IN-HEAD FIBER TEASING

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US); Kaleb Forrest Beebout, Post Falls, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 227 days.

(21) Appl. No.: 15/682,666

(22) Filed: Aug. 22, 2017

(65) Prior Publication Data

US 2018/0065300 A1 Mar. 8, 2018

Related U.S. Application Data

(60) Provisional application No. 62/449,899, filed on Jan. 24, 2017, provisional application No. 62/383,801, filed on Sep. 6, 2016.

(51) Int. Cl.
*B29C 64/20* (2017.01)
*B29C 64/209* (2017.01)
*B33Y 10/00* (2015.01)
*B33Y 30/00* (2015.01)

(52) U.S. Cl.
CPC ............ *B29C 64/209* (2017.08); *B33Y 10/00* (2014.12); *B33Y 30/00* (2014.12)

(58) Field of Classification Search
CPC ... B29C 64/209; B29C 64/205; B29C 64/165; B29C 64/321; B29C 64/336; B33Y 10/00; B33Y 30/00
See application file for complete search history.

(56) References Cited

U.S. PATENT DOCUMENTS

| | | | |
|---|---|---|---|
| 3,286,305 A | 11/1966 | Seckel | |
| 3,809,514 A | 5/1974 | Nunez | |
| 3,984,271 A | 10/1976 | Gilbu | |
| 3,993,726 A | 11/1976 | Moyer | |
| 4,643,940 A | 2/1987 | Shaw et al. | |

(Continued)

FOREIGN PATENT DOCUMENTS

| | | |
|---|---|---|
| DE | 4102257 A1 | 7/1992 |
| EP | 2589481 B1 | 1/2016 |

(Continued)

OTHER PUBLICATIONS

M.S. Ifran, Lateral Spreading of a Fiber bundle via mechanical means, Journal of Composite Materials, Feb. 2012, pp. 311-330, 46(3), Sage Publishing, UK.

(Continued)

*Primary Examiner* — Joseph S Del Sole
*Assistant Examiner* — Jamel M Nelson
(74) *Attorney, Agent, or Firm* — Ryan C. Stockett

(57) ABSTRACT

A head is disclosed for an additive manufacturing system. The head may include a body, and a nozzle connected to a discharge end of the body. The nozzle may be configured to discharge a composite material including a matrix and a continuous reinforcement that is at least partially coated in the matrix. The head may also include a fiber-teasing mechanism located inside the body and upstream of the nozzle.

19 Claims, 3 Drawing Sheets

(56) References Cited

U.S. PATENT DOCUMENTS

| | | |
|---|---|---|
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,268,050 A * | 12/1993 | Azari ............... B29B 9/06 156/180 |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,895,622 A * | 4/1999 | Ramani ............... B05D 1/045 118/308 |
| 5,936,861 A | 8/1999 | Jang et al. |
| 6,153,034 A | 11/2000 | Lipsker |
| 6,251,206 B1 | 6/2001 | Saito et al. |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0221085 A1 * | 10/2005 | Lo ............... B29B 15/127 428/375 |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0106014 A1 | 5/2013 | Ishibashi et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 * | 5/2015 | Fleming ............... B33Y 80/00 174/255 |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |

(56) References Cited

U.S. PATENT DOCUMENTS

| | | |
|---|---|---|
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

International Search Report dated Nov. 20, 2017 for Application PCT/US2017/050104, to CC3D LLC filed on Sep. 5, 2017.

* cited by examiner

US 10,543,640 B2

ADDITIVE MANUFACTURING SYSTEM HAVING IN-HEAD FIBER TEASING

RELATED APPLICATIONS

This application is based on and claims the benefit of priority from U.S. Provisional Application Nos. 62/383,801 that was filed on Sep. 6, 2016, and 62/449,899 that was filed on Jan. 24, 2017, the contents of all of which are expressly incorporated herein by reference.

TECHNICAL FIELD

The present disclosure relates generally to a manufacturing system and, more particularly, to an additive manufacturing system having in-head fiber-teasing.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers.

Although extrusion and pultrusion manufacturing can be efficient ways to continuously manufacture low- and high-strength structures, the resulting structures may lack the form (shape, size, and/or precision) required for some applications. In addition, complete wetting of the associated fibers can be difficult in some applications, particularly in applications requiring high volumes of fibers.

The disclosed system is directed to addressing one or more of the problems set forth above and/or other problems of the prior art.

SUMMARY

In one aspect, the present disclosure is directed to a head for an additive manufacturing system. The head may include a body, and a nozzle connected to a discharge end of the body. The nozzle may be configured to discharge a composite material including a matrix and a continuous reinforcement that is at least partially coated in the matrix. The head may also include a fiber-teasing mechanism located inside the body and upstream of the nozzle.

In another aspect, the present disclosure is directed to another head for an additive manufacturing system. This head may include a body, and a nozzle connected to a discharge end of the body. The nozzle may be configured to discharge a composite material including a matrix and a continuous reinforcement that is at least partially coated in the matrix. The head may also include a plurality of protrusions located inside the body and upstream of the nozzle at different radial distances from an axis of the body. The plurality of protrusions may be configured to separate fibers of the continuous reinforcement prior to the matrix coating the continuous reinforcement. The head may further include a feed mechanism configured to pull the continuous reinforcement through the plurality of protrusions, and a cure enhancer connected to an end of the body adjacent the nozzle and configured to cure the matrix.

In yet another aspect, the present disclosure is directed to an additive manufacturing system. The additive manufacturing system may include a support, and a head connected to an end of the support. The head may include a body, and a nozzle connected to a discharge end of the body. The nozzle may be configured to discharge a composite material including a matrix and a continuous reinforcement that is at least partially coated in the matrix. The head may also include a fiber-teasing mechanism located inside the body and upstream of the nozzle, a feed mechanism configured to pull the continuous reinforcement through the fiber-teasing mechanism before the continuous reinforcement is coated with the matrix, and a cure enhancer connected to the body and configured to enhance curing of the matrix. The additive manufacturing system may also include a controller in communication with the support and the head. The controller may be configured to selectively cause the support to move the head in multiple dimensions during material discharge.

DETAILED DESCRIPTION

Figure 1:
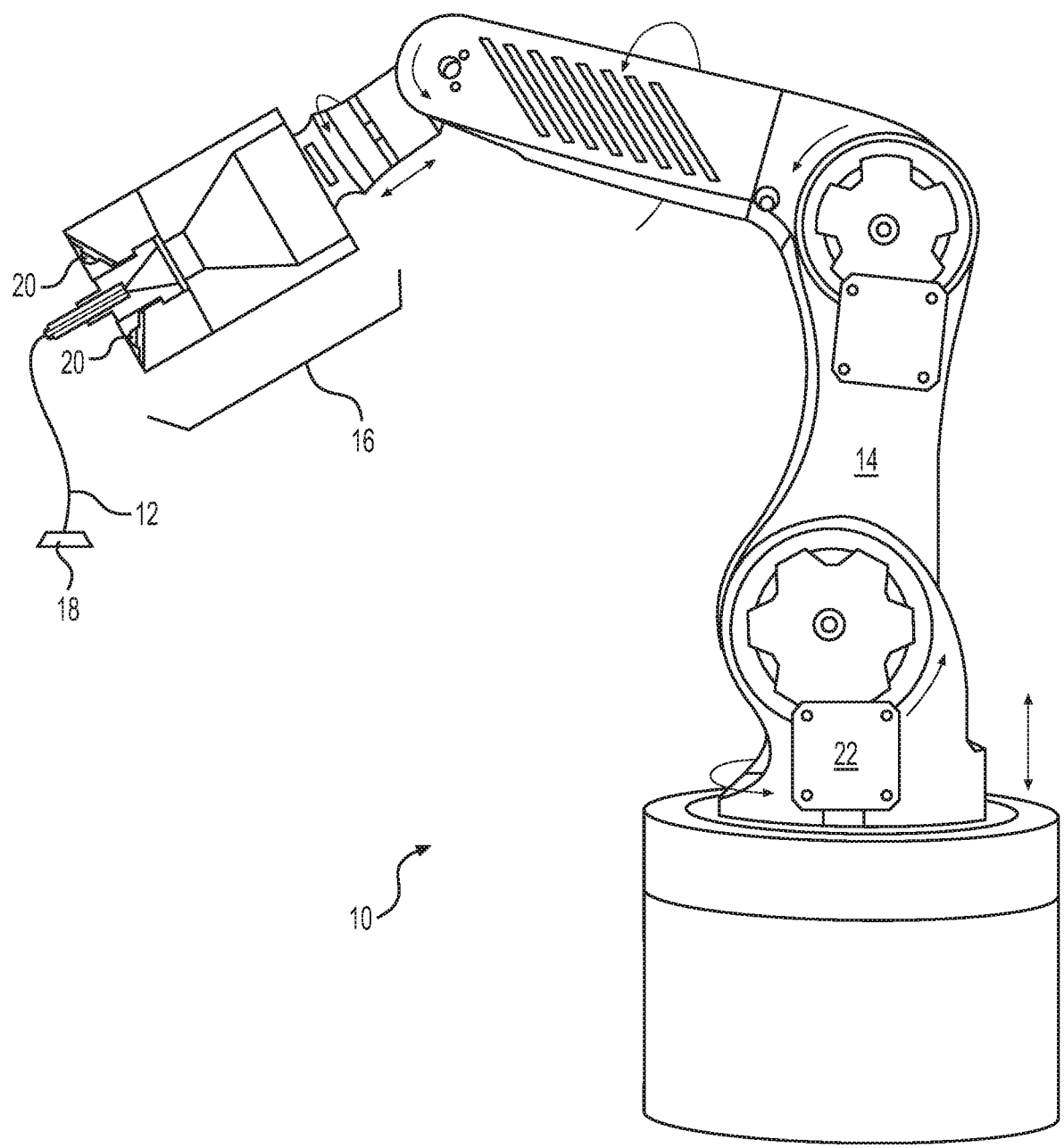
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may have a body 17 that is coupled to and moved by support 14, and a nozzle 19 located at an opposing discharge end of body 17. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry also capable of moving head 16 in multiple directions during fabrication of structure 12. Although support 14 is shown as being capable of 6-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Body 17 may be configured to receive or otherwise contain a matrix material. The matrix material may include any type of matrix material (e.g., a liquid resin, such as a zero volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside body 17 may be pressurized, for example by an external device (e.g., an extruder or another type of pump—not shown) that is fluidly connected to head 16 via a corresponding conduit (not shown). In another embodiment, however, the pressure may be generated completely inside of body 17 by a similar type of device. In yet other embodiments, the matrix material may be gravity-fed through and/or mixed within body 17. In some instances, the matrix material inside body 17 may need to be kept cool and/or dark to inhibit premature curing; while in other instances, the matrix material may need to be kept warm for the same reason. In either situation, body 17 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 12. The reinforcements may be stored within (e.g., on separate internal spools—not shown) or otherwise passed through body 17 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from nozzle 19.

The reinforcements may be exposed to (e.g., coated with) the matrix material while the reinforcements are passing through body 17. The matrix material, dry reinforcements, and/or reinforcements that are already exposed to the matrix material (e.g., wetted reinforcements) may be transported into body 17 in any manner apparent to one skilled in the art.

The matrix material and reinforcement may be discharged from nozzle 19 via at least two different modes of operation. In a first mode of operation, the matrix material and reinforcement are extruded (e.g., pushed under pressure and/or mechanical force) from nozzle 19, as head 16 is moved by support 14 to create the 3-dimensional shape of structure 12. In a second mode of operation, at least the reinforcement is pulled from nozzle 19, such that a tensile stress is created in the reinforcement during discharge. In this mode of operation, the matrix material may cling to the reinforcement and thereby also be pulled from nozzle 19 along with the reinforcement, and/or the matrix material may be discharged from nozzle 19 under pressure along with the pulled reinforcement. In the second mode of operation, where the matrix material is being pulled from nozzle 19, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from nozzle 19 as a result of head 16 moving away from an anchor point 18. In particular, at the start of structure-formation, a length of matrix-impregnated reinforcement may be pulled and/or pushed from nozzle 19, deposited onto anchor point 18, and cured, such that the discharged material adheres to anchor point 18. Thereafter, head 16 may be moved away from anchor point 18, and the relative movement may cause the reinforcement to be pulled from nozzle 19. It should be noted that the movement of reinforcement through body 17 could be assisted (e.g., via one or more internal feed mechanisms 24—shown only in FIG. 2), if desired. However, the discharge rate of reinforcement from nozzle 19 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., a UV light, an ultrasonic emitter, a laser, a heater, a catalyst dispenser, etc.) 20 may be mounted proximate (e.g., within, on, and/or trailing from) head 16 (e.g., at a base of body 17 and adjacent nozzle 19) and configured to enhance a cure rate and/or quality of the matrix material as it is discharged from head 16. Cure enhancer 20 may be controlled to selectively expose internal and/or external surfaces of structure 12 to energy (e.g., UV light, electromagnetic radiation, vibrations, heat, a chemical catalyst or hardener, etc.) during the formation of structure 12. The energy may increase a rate of chemical reaction occurring within the matrix material, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system(s) 10 and/or 12. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, shape, and/or location of desired curing. Controller 22 may then correlate operation of support 14 (e.g., the location and/or orientation of head 16) and/or the discharge of material from nozzle 19 (a type of material, desired performance of the material, cross-linking requirements of the material, a discharge rate, etc.) with the operation of cure enhancers 20 such that structure 12 is produced in a desired manner.

Figure 2:
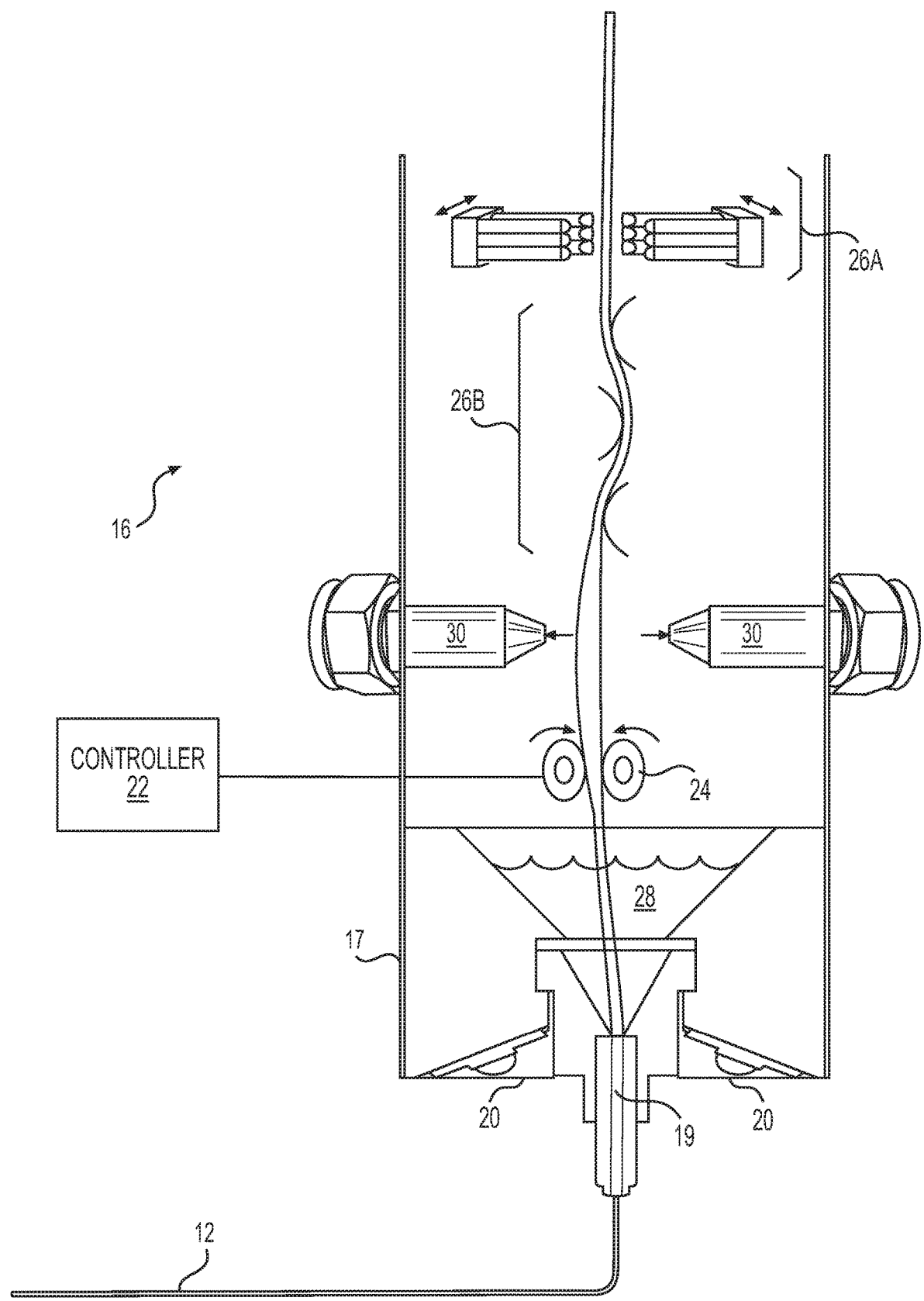
FIG. 2 is a diagrammatic illustration of an exemplary disclosed head that may be used in conjunction with the manufacturing system of FIG. 1.

In some applications, care must be taken to ensure that the fibers passing through head 16 are sufficiently wetted with the matrix material (i.e., wetted sufficient to ensure proper curing and bonding) prior to discharge from nozzle 19. As shown in FIG. 2, the fibers may be wetted during travel through a bath 28 of the matrix material that is located inside of body 17. In another example, the fibers may be sprayed with the matrix material (e.g., by way of one or more jets 30) during passage through body 17. It is also contemplated that the fibers may be wetted via a combination of bath(s) 28 and jets 30, if desired. In this situation, baths 28 may primarily be used to coat an outer surface of the fibers, while jets 30 may function to separate the fibers and/or to push matrix material inside of the fibers. It is contemplated that jets 30 may be used to only separate or tease the fibers (e.g., via high-pressure matrix and/or a gas, such as air), if desired, prior to submersion and coating of individual fibers with the matrix material in bath 28.

Even with a combination of matrix baths 28 and jets 30, it may still be possible for a center of the fibers to receive and/or be coated with too little matrix. This may be more likely when large tows or thick ribbons are passed through head body 17 at higher speeds. For this reason, head 16 may be equipped with one or more fiber-teasing mechanisms 26 that help to separate and/or flatten the fibers, such that the matrix material can penetrate to a center of the fibers more thoroughly and/or quicker.

FIG. 2 illustrates exemplary mechanisms 26 located inside of body 17 that are dedicated to separating or teasing the fibers, prior to with the fibers reaching a matrix-wetting area (e.g., at a location upstream of matrix bath 28 and/or jets 30). A first of these mechanisms 26 may include one or more brushes 26A having bristles located to engage the fibers as the fibers enter and/or pass through body 17. In one example, two brushes 26A are moveably mounted inside body 17 and configured to engage the fibers from opposing directions, such the that fibers are sandwiched therebetween. Brushes 26A may be configured to move (e.g., to oscillate or vibrate) in opposition to each other, to thereby cause the fibers to move apart from each other. It is contemplated that a spacing between brushes 26A may be adjusted, if desired, to thereby vary a pressure exerted by the bristles on the fibers.

Another fiber-teasing mechanism 26 that may be mounted within body 17 includes a set of protrusions 26B, which together form a tortuous path through which the fibers pass prior to matrix impregnation. In the disclosed example, three protrusions 26B are included and offset from each other in a radial direction such that the fibers are forced to change trajectory during passage over each protrusion 26B. It is contemplated that an axial distance and/or a radial offset between protrusions 26B may be selectively adjusted to vary an amount of fiber-teasing and/or an amount of drag placed on the fibers by protrusions 26B. It is also contemplated that protrusions 26B may be stationary and rotationally fixed objects, or moveable (e.g., rotational).

Figure 3:
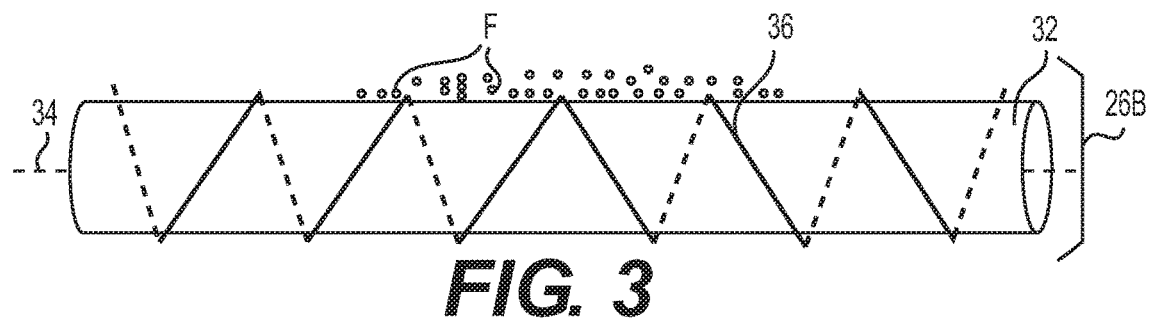
FIGS. 3-5 are diagrammatic illustrations of exemplary teasing mechanisms that may be located within the head of FIG. 2.
Figure 4:
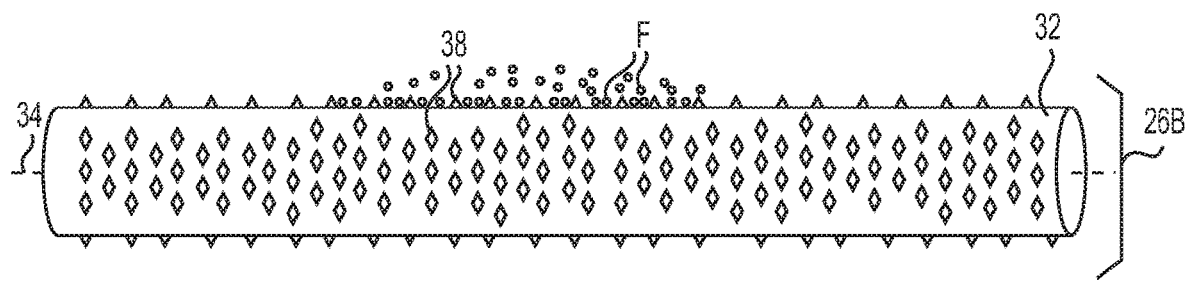
Figure 5:
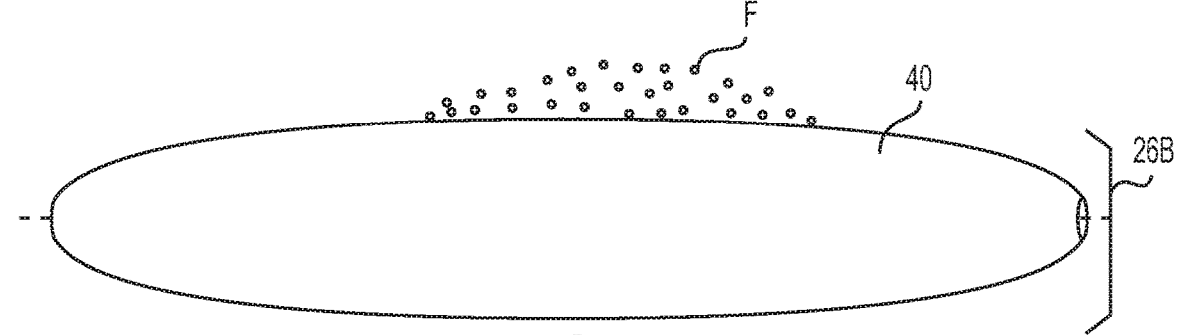

FIGS. 3-5 illustrate three exemplary embodiments of protrusions 26B. As shown in FIG. 3, a first protrusion 26B may include a generally cylindrical body 32 having an axis 34 that extends generally perpendicular to the fibers (represented as F in FIGS. 3-5) passing through body 17 (referring to FIG. 2), and a plurality of spreading features 36 formed on an outer annular surface of generally cylindrical body 32. Spreading features 36 may be, for example, spiraling grooves and/or ridges that initiate at a lengthwise center of body 32 and move axially outward toward opposing ends of body 32. As the fibers F engage these features 36, the fibers F may be urged to spread out over the outer annular surface of body 32. For example, individual fibers F may be separated from each other by the intermittent penetration of features 36 into the tow or ribbon. It is contemplated that any number of spreading features 36 may be utilized and have any spiral angle or spacing.

As shown in FIG. 4, a second exemplary protrusion 26B may also include generally cylindrical body 32 having axis 34 that extends generally perpendicular to the fibers F passing through body 17 (referring to FIG. 2), and a plurality of spreading features 38 formed on the outer annular surface of generally cylindrical body 32. Spreading features 38 may be, for example, separate protuberances (e.g., bumps, fingers, juts, etc.) that extend radially outward. In some embodiments, the protuberances are randomly located. In other embodiments, however, the protuberances are arranged in a grid or a spiraling pattern. Like features 36, features 38 may be configured to separate individual fibers F or groups of fibers F from each other prior to submersion of the fibers into the matrix material.

As shown in FIG. 5, a third protrusion 26C may not necessarily have a cylindrical body. Instead, protrusion 26C may include a body 40 having a generally concave or crowning outer surface. In some embodiments, the crowning outer surface of body 40 may be roughened, if desired. The concave or crowning nature of body 40 may function to spread the fibers F outward in the axial direction.

It is contemplated that fiber-teasing mechanisms 26 may be used to wet the fibers F passing therethrough, in addition to separating the fibers, in some applications. For example, rather than being located upstream of bath 28, fiber teasing mechanism 26 may alternatively be located inside bath 28, such that the separation of fibers F causes immediate ingress of the matrix material at the same time. In another example, fiber-teasing mechanisms 26 may actually force the matrix material into the fibers. For instance, pressurized matrix could be provided internally to the bristles of fiber-teasing mechanisms 26A, such that the matrix material is extruded from tips of the bristles into the fibers F. Alternatively, pressurized matrix could be provided to fiber-teasing mechanisms 26B and/or 26B (e.g., via an axial passage, and connected radial capillaries) and extruded through orifices within spreading features 38.

In some embodiments, the passage of fibers F through fiber-teasing mechanisms 26 may generate drag on the fibers F. Although some drag may be acceptable and even desired (e.g., to inhibit bunching within head 16), too much drag could damage the fibers and/or make fabrication of structure 12 difficult. For this reason, feed mechanism 24 (e.g., rollers powered to counterrotate) may be located downstream of fiber-teasing mechanisms 26. Feed mechanism 24 may be controlled to selectively pull fibers F through fiber-teasing mechanisms 26 at a rate corresponding to the movement speed of head 16. In addition to pulling fibers F through fiber-teasing mechanism 26, an engagement pressure of feed mechanism 24 may be selectively adjusted to vary an amount of drag placed on the material discharging from nozzle 19 and/or to vary an amount of matrix material coating the fibers F.

INDUSTRIAL APPLICABILITY

The disclosed system may be used to continuously manufacture composite structures having any desired cross-sectional shape, length, density, and/or strength. The composite structures may include any number of different reinforcements of the same or different types, diameters, shapes, configurations, and consists, and/or any number of different matrixes. Operation of system 10 will now be described in detail.

At a start of a manufacturing event, information regarding a desired structure 12 may be loaded into system 10 (e.g., into controller 22 that is responsible for regulating operation of support 14, cure enhancer(s) 20, feed mechanism 24, and/or jets 30). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), location-specific matrix stipulations, location-specific reinforcement stipulations, desired cure rates, cure locations, cure shapes, cure amounts, etc. It should be noted that this information may alternatively or additionally be loaded into system 10 at different times and/or continuously during the manufacturing event, if desired.

Based on the component information, a specific nozzle 19 and/or cure enhancer configuration may be connected to head 16 (e.g., to the discharge end of body 17), and one or more different (e.g., different sizes, shapes, and/or types of) reinforcements and/or matrix materials may be selectively installed within system 10 and/or continuously supplied into nozzle 19. For example, a nozzle 19 that is configured to discharge a flat ribbon of fiberglass material or a nozzle 19 that is configured to discharge a round tow of carbon fibers may be connected to head 16. The corresponding reinforcements may then be passed through one or more fiber-teasing mechanism 26 (e.g., between the bristles of adjacent brushes 26A and/or over or around protrusions 26B) and the selected nozzle 19, and thereafter connected to a pulling machine (not shown) and/or to a mounting fixture (e.g., to anchor point 18). Installation of the matrix material may include filling head 16 and/or coupling of an extruder (not shown) to head 16.

Head 16 may be moved by support 14 under the regulation of controller 22 to cause matrix-coated reinforcements to be placed against or on a corresponding anchor point 18. Cure enhancers 20 may then be selectively activated (e.g., turned on/off and/or intensity-adjusted by controller 22) to cause hardening of the matrix material surrounding the reinforcements, thereby bonding the reinforcements to anchor point 18.

The component information may then be used to control operation of system 10. For example, the reinforcements may be pulled through fiber-teasing mechanism(s) 26 by feed mechanism(s) 24; separated by bristles, jets 30, features 36, and/or features 38; submerged within the liquid matrix; and then discharged from nozzle 19. Controller 22 selectively cause support 14 to move head 16 in a desired manner at this time, such that an axis of the resulting structure 12 follows a desired trajectory (e.g., a free-space, unsupported, 3-D trajectory). In addition, cure enhancers 20 may be selectively activated by controller 22 during material discharge to cause the liquid matrix to harden. Once structure 12 has grown to a desired length, structure 12 may be disconnected (e.g., severed) from head 16 in any desired manner.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. A head for an additive manufacturing system having a support, the head comprising:
    a body connectable to and moveable by the support;
    a wetting location inside the body at which a continuous reinforcement is wetted with a matrix to form a composite material;
    a nozzle connected to a discharge end of the body and configured to discharge the composite material; and
    a fiber-teasing mechanism located inside the body and positioned upstream of the nozzle and the wetting location, wherein the body, the fiber-teasing mechanism, and the nozzle being configured to move together during movement of the support.

2. The head of claim 1, wherein the fiber-teasing mechanism includes at least one brush having bristles configured to engage the continuous reinforcement during movement of the continuous reinforcement through the body.

3. The head of claim 2, wherein the at least one brush includes a plurality of brushes located at opposing sides of the continuous reinforcement.

4. The head of claim 2, wherein the at least one brush is configured to move in a direction generally orthogonal to a movement direction of the continuous reinforcement through the body.

5. The head of claim 1, wherein the fiber-teasing mechanism is configured to at least one of flatten or separate fibers of the continuous reinforcement prior to the matrix coating the continuous reinforcement.

6. The head of claim 1, wherein the fiber-teasing mechanism includes a jet configured to separate fibers in the continuous reinforcement.

7. The head of claim 1, wherein the fiber-teasing mechanism includes at least one protrusion located in a path of the continuous reinforcement through the body, the at least one protrusion causing the continuous reinforcement to change trajectory.

8. The head of claim 7, wherein the at least one protrusion includes a plurality of protrusions, each located a different radial distance from an axis of the body and at a different axial position.

9. The head of claim 7, wherein the at least one protrusion includes at least one spreading feature configured to spread fibers in the continuous reinforcement outward in a radial direction.

10. The head of claim 9, wherein the at least one spreading feature includes:
    a generally cylindrical body; and
    at least one of a spiraling groove or ridge that extends from an axial center of the generally cylindrical body outward toward opposing ends of the generally cylindrical body.

11. The head of claim 9, wherein the at least one spreading feature includes a body having a crowning outer surface.

12. The head of claim 9, wherein the at least one spreading feature includes:
   a generally cylindrical body; and
   a plurality of protuberances extending radially outward from the generally cylindrical body.

13. The head of claim 1, further including a feed mechanism configured to pull the continuous reinforcement through the fiber-teasing mechanism.

14. The head of claim 1, further including a cure enhancer connected to an end of the body adjacent the nozzle and configured to expose the matrix to light energy at an outlet of the nozzle.

15. A head for an additive manufacturing system, comprising:
   a body;
   a wetting location inside the body at which a continuous reinforcement is wetted with a matrix to form a composite material;
   a nozzle connected to a discharge end of the body and configured to discharge the composite material;
   a plurality of protrusions located inside the body positioned and upstream of the nozzle and the wetting location, the plurality of protrusions being positioned at different radial distances from an axis of the body and configured to separate fibers of the continuous reinforcement prior to the matrix coating the continuous reinforcement;
   a feed mechanism configured to pull the continuous reinforcement through the plurality of protrusions; and
   a cure enhancer connected to an end of the body adjacent the nozzle and configured to cure the matrix, the cure enhancer configured to expose the composite material exiting the nozzle to light energy to harden the matrix.

16. An additive manufacturing system, comprising:
   a support;
   a head connected to an end of the support, and including:
      a body;
      a wetting location inside the body at which a continuous reinforcement is wetted with a matrix to form a composite material;
      a nozzle connected to a discharge end of the body and configured to discharge the composite material; and
      a fiber-teasing mechanism located inside the body and positioned upstream of the nozzle and the wetting location;
   a feed mechanism configured to pull the continuous reinforcement through the fiber-teasing mechanism before the continuous reinforcement is coated with the matrix;
   a cure enhancer connected to the body and configured to enhance curing of the matrix; and
   a controller in communication with the support and the head, and configured to selectively cause the support to move the head in multiple dimensions during material discharge.

17. The additive manufacturing system of claim 16, wherein the fiber-teasing mechanism includes at least one brush having bristles configured to engage the continuous reinforcement during movement of the continuous reinforcement through the body.

18. The additive manufacturing system of claim 16, wherein the fiber-teasing mechanism includes a jet configured to separate fibers in the continuous reinforcement.

19. The additive manufacturing system of claim 16, wherein the fiber-teasing mechanism includes a plurality of protrusions located in a path of the continuous reinforcement through the body and configured to cause the continuous reinforcement to change trajectory.

* * * * *